United States Patent Office 2,766,311
Patented Oct. 9, 1956

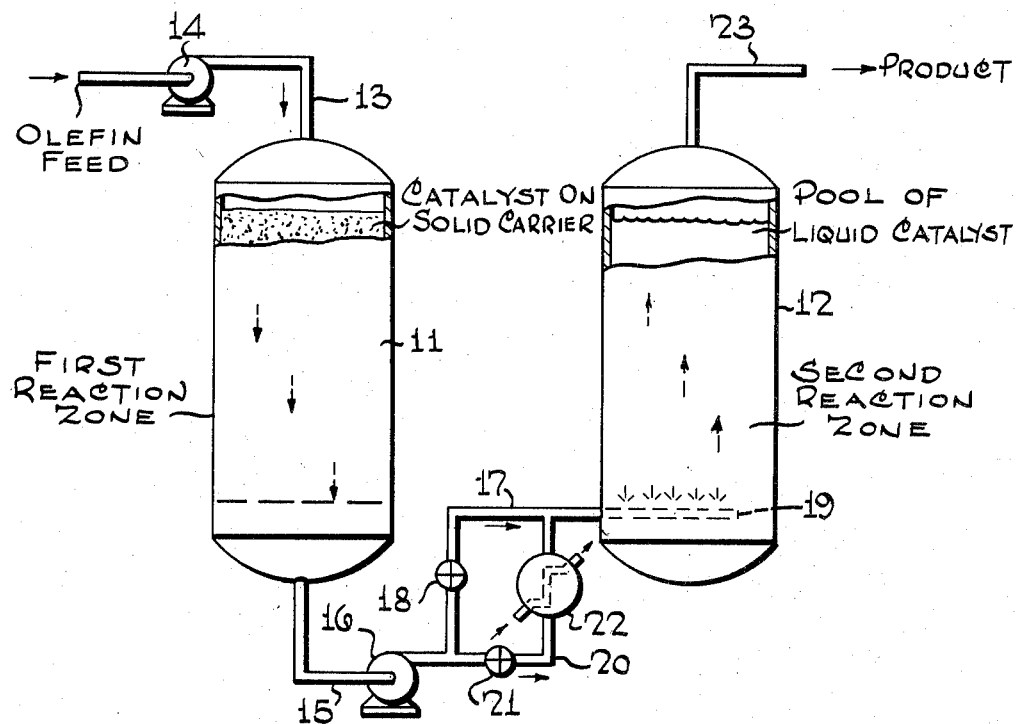

2,766,311

COMBINATION CATALYTIC POLYMERIZATION PROCESS

Ivan Mayer, Summit, and Edward J. Gornowski, Cranford, N. J., assignors to Esso Research and Engineering Company, a corporation of Delaware Application August 28, 1952, Serial No. 306,802

5 Claims. (Cl. 260—683.15)

The present invention relates to an improved process for the catalytic polymerization of olefinic hydrocarbons and the like. More particularly, it relates to an improved two-stage polymerization process in which olefins are contacted with an acid of phosphorus in both zones.

It is well known in the art to employ various acids of phosphorus as catalysts for polymerizing olefins to form polymers suitable as blending agents for motor fuels, as intermediates in preparing various chemicals and the like. Catalysts comprising an acid of phosphorus supported on a solid carrier have been particularly useful. These catalysts include those in which the acid is impregnated into a solid adsorbent support, those in which the acid is supported as a film on inert solid carriers, and the like. Olefin conversions above 90 to 95% may be obtained with these catalysts; however, the reactor volume required relative to the olefin feed, is quite high when such high conversions are achieved. Furthermore, the higher the olefin conversion obtained, the more severe the reaction conditions needed. Consequently, loss in catalyst activity is accelerated at the higher olefin conversion levels.

The use of acids of phosphorus in the form of a liquid pool as a polymerization catalyst has met with little commercial success. Although this material is cheaper than the solid catalysts, it is quite corrosive to most metals under reaction conditions. The cost of reaction equipment prepared from corrosion resistant metals is generally prohibitive in comparison with the cost of equipment for the solid catalyst processes.

It is the primary purpose of the present invention to provide a new and useful mode for utilizing the above two general types of processes in a combination process whereby unexpected improvements are realized. The objects of this invention will be amplified in the following description taken in connection with the sole figure which represents a preferred embodiment of the present process.

In accordance with the present invention, a first reaction zone is provided with catalyst comprising an acid of phosphorus as the discontinuous phase, such as an acid supported on a solid carrier, and a second zone is provided with a catalyst comprising an acid of phosphorus as the continuous phase, such as liquid acid. An olefin feed stream is passed through the first zone under conditions whereby a substantial portion of the olefins are converted to useful polymers but whereby incomplete olefin conversion takes place. The effluent withdrawn from this system is then passed through the catalyst in the second zone under conditions whereby a substantial portion of the unreacted olefins are polymerized.

By operating in accordance with this procedure, the total reaction zone volume required to obtain a given olefin conversion at a given olefin throughput is considerably less than the volume required for either of the processes used alone. This result is quite unexpected since the reactor volume required to obtain high olefin conversions is substantially the same with fresh catalysts, regardless of the type of catalyst used. Obviously, this substantially lowers investment costs for equipment, particularly when employing the expensive corrosion resistant construction materials. Improvements in processing are also obtained. Since olefin conversions are held to a relatively low level, such as below about 80 to 90%, in the first zone, less severe reaction conditions are needed than in conventional operations. Consequently, catalyst contamination is decreased, and overall catalyst life and activity are improved. Catalyst contamination is not a serious problem in liquid phase catalyst systems, and the use of this catalyst for completing olefin polymerization up to high conversion levels introduces few problems in this respect.

It has been found that the polymerization reaction closely approaches a second order process when using the catalyst as a discontinuous phase, such as in the form of a supported phosphoric acid catalyst. In effect, the amount of olefins converted varies as the square of the olefin concentration, expressed in units such as mols per cubic foot. At high olefin concentrations the amount of material polymerized per unit time is relatively large. A marked decrease in the amount of polymerization takes place as olefin concentration decreases. When olefin concentration is quite small, considerable reactor volume is required to obtain high conversions.

On the other hand, it has been discovered that reaction kinetics are of the pseudo first order type when acids of phosphorus are used as a circulating continuous phase. The amount of olefin polymerized varies as the olefin concentration to the first power, and the amount of olefins polymerized is not nearly so sensitive to olefin concentration as in the case in which the solid catalyst is used. The amount of olefins polymerized per unit time when employing liquid catalyst, for example, is not as favorable at high concentrations as is obtainable with a solid catalyst. However, the amount of olefins reacted per unit time at low concentrations is nearly as great as that at high concentrations with the liquid catalyst. Therefore, the present invention takes advantage of the high reaction rates obtainable with relatively high olefin concentrations for the solid-type catalyst and the relatively high reaction rates obtained at low olefin concentrations for the liquid catalyst. These improvements cannot be obtained when using the liquid catalyst in the first zone followed by the solid-type catalyst.

The unexpected differences obtained in reaction kinetics obtained when using the same general type of catalyst in different forms are not understood. It is not desired to be bound by any theories regarding these differences. However, variations in hydrocarbon diffusion rates with the two types of catalysts may have some influence. For example, the hydrocarbons are the continuous phase when using the solid-type catalyst. The liquid acid, on the other hand, is the continuous phase when using this catalyst.

Turning now to the figure, the numeral 11 designates a first reaction zone and 12 a second reaction zone. Zone 11 contains a conventional solid phosphoric acid catalyst in the form of a fixed bed. This reaction zone may consist of a series of tubular-type steam condenser jacketed reactors, or banks of heat exchangers with granular solid phosphoric acid inside the tubes, or any other conventional type of fixed bed catalytic reaction zone. Zone 11 may consist of a single reactor as shown or may include two or more reaction zones operating in series.

Zone 12 includes one or more conventional reactors containing liquid phosphoric acid. The liquid acid may be in the form of a pool or column through which olefin may be bubbled. This reaction zone may consist of contact towers such as towers equipped with bell cap trays and other contacting devices permitting the liquid acid to flow downwardly from tray to tray followed by recycling the acid to the top of the tower. A tower may also be provided with contacting materials such as carbon Berl saddles, Raschig rings, or ceramic packing that is resistant to liquid phosphoric acid. In any of these packed towers the liquid acid is the continuous phase and exists as a pool rather than a film on the packing.

Olefin feed is introduced into zone 11 by means of pipe 13 containing pump 14 and is passed through the catalyst therein under suitable temperature, pressure and feed rate conditions to effect substantial but incomplete conversion of olefins to polymer. Effluent including polymer and unreacted olefins is withdrawn from zone 11 via line 15. It is pumped by means of pump 16 through line 17 containing valve 18 into distribution means 19 positioned in the lower portion of zone 12. Distribution means 19 may consist of a conventional pipe spider, nozzles or other devices for injecting the effluent into contact with the liquid acid.

If temperature conditions in zone 12 are substantially different from those in zone 11, effluent withdrawn through line 15 may be passed through branch line 20 containing valve 21 and heat exchange means 22, and thence through distributing means 19. The route taken by the effluent is readily controlled by suitable adjustment of valves 18 and 21. Heat exchange means 22 may be used to increase or decrease the temperature of the effluent, depending on the temperature level to be maintained in zone 12.

In the event pressure levels in zones 11 and 12 are different, the effluent from zone 11 may be passed through conventional pressurizing or depressurizing means, not shown, before passage into zone 12.

The effluent then passes through zone 12 under conditions such that a substantial portion of the unreacted olefins therein are polymerized. A product stream containing olefin polymers is withdrawn from zone 12 by line 23 and is passed to suitable recovery means not shown.

The catalyst employed in the first reaction zone may be any suitable acid of phosphorus supported on a solid support. These include the solid granular catalysts containing the acid impregnated on kieselguhr, silica gel, activated carbons, various diatomaceous earths, clays, alumina silicates and the like. These catalysts may contain various promoters such as oxides, phosphates and sulfates of nickel, copper, zinc, etc. As a rule, such catalysts will contain in the range of about 50 to 90% acid. The catalyst may also be the so-called film type catalyst in which a non-porous inert support is wetted with a thin adsorbent film of aqueous phosphoric acid. Inert solid supports include graphite, silica, quartz, and the like. These catalysts are well known to the art and give substantially second-order polymerization of olefins, in contrast to the acid in the form of a pool. These and other supported catalysts of this type are applicable to the present invention, and the particular form the supported catalyst takes is not generally critical.

The granular solid catalysts may be used as a fixed bed through which the olefin passes or as a finely divided solid catalyst suspended in fluid hydrocarbon such that olefins may contact the suspension under polymerization conditions. Thus, phosphoric acid deposited on kieselguhr may be suspended in dense hydrocarbon and the feed olefin passed upwardly through the agitated suspension under suitable conditions.

The reaction conditions maintained in zone 11 will be adjusted to obtain substantial but incomplete olefin conversion therein. Generally, at least a major portion of the olefins, and preferably in the range of 65 to 90% of the olefins, are polymerized in this zone. Reaction pressures may vary considerably, such as from atmospheric up to 2000 p. s. i. g. or higher, with pressures above about 500 p. s. i. g. favoring higher olefin conversions.

Temperatures in the range of about 250° to 600° F. are generally suitable in zone 11, although temperatures as low as 50° F. may sometimes be used. Olefin feed rates may range from about 0.1 to 20 liquid volumes per volume of catalyst per hour. Reaction conditions will generally be relatively less severe than those conventionally used with these catalysts since this process requires lower initial olefin conversions. The solid phosphoric acid catalysts have appreciable vapor pressure at reaction temperatures and lose activity if extraneous water is not provided in the reaction zone. Water may be added with the olefin feed or directly into the zone generally in an amount such that its partial pressure substantially balances catalyst vapor pressure.

The desired olefin conversion level may be obtained by a once-through passage of olefin feed, by recycling a portion of the effluent back through zone 11 or by operating several zones containing solid catalysts in series. In any event, the effluent withdrawn from this system is preferably passed without further separation to the second reaction zone 12.

The liquid acids suitable for use in zone 12 include the various concentrated acids of phosphorus known to the art. Phosphoric acids having a strength in the range of about 75 to 110% are particularly suitable. As previously mentioned, the liquid acid may be in the form of a pool, and the zone may contain inert contacting materials, etc. The liquid acid should not be quiescent, and some degree of agitation and circulation should be provided such as by injecting jetted streams of effluent into it, by continuously recycling a portion of the acid from the bottom to the top of the tower, or by other circulation methods. Regardless of the contacting devices used, the liquid acid should be the continuous phase at the point of contact with the hydrocarbon.

The liquid acid of phosphorus may also contain various soluble promoters or other addition agents modifying the activity thereof. Such materials include salts of aluminum, zinc, cadmium, nickel, copper and the like which are known to the art. Amounts of these materials in the range of about 2 to 20%, based on the acid, may be used. Particularly suitable additives include various organic phosphates, such as triaryl phosphates. For example, mixtures of 100% phosphoric acid and tricresyl phosphate, containing about 5 to 70% tricresyl phosphate based on the total mixture, are extremely effective liquid phase catalysts. Such mixtures have high activities at pressures as low as atmospheric, showing considerably greater activity than the phosphoric acid alone. Obviously, the liquid catalyst may comprise mixtures of various phosphorus and phosphoric acids, of acids containing phosphorus oxides such as phosphorus pentoxide, and the like. Solutions comprising mixtures of $P_2O_5$ and trialkyl phosphates, such as tributyl phosphate, are also useful.

Various specific acids of phosphorus suitable for manufacturing the solid catalysts or useful as a component of the liquid catalyst include orthophosphoric acid, pyrophosphoric acid, triphosphoric acid, tetraphosphoric acid ($3H_2O.2P_2O_5$), and the like, those wherein the phosphorus has a valence of five being preferred. Orthophosphoric acid is particularly preferred because of its cheapness and availability. The catalysts used in the two zones may be derived from the same acid or from different acids of phosphorus.

Reaction conditions in zone 12 will be in the same general range as those in zone 11; however, since the liquid catalyst is quite active, lower temperature and pressure conditions may prevail in this zone than in zone 11 to achieve desired olefin conversions. Optimum conditions, with concentrated ortho- or pyro-phosphoric acids, range from about 250° to 500° F. and 300 to 750 p. s. i. g. The primary function of zone 12 is that of olefin cleanup, i. e., to complete the over-all desired degree of olefin conversion. Reaction conditions should therefore be adjusted to accomplish this purpose. Generally, it will be desired to obtain over-all olefin conversions as high as 90 to 95%. The polymers formed in zone 12 will be in the same general boiling range and have about the same molecular weight as those produced in the first zone.

It is desirable to maintain a substantially uniform temperature profile throughout the liquid catalyst in order to achieve substantially isothermal reaction conditions. Suitable temperature control means may be used to remove the exothermic heat of reaction and to maintain uniform temperatures. Circulation of the liquid catalyst, as described above, is also quite desirable to aid in maintaining uniform temperatures. The strength of the liquid acid may also be controlled by periodically or continuously removing any water added thereto by the zone 11 effluent.

The fresh olefin feed may be substantially pure individual olefins, mixtures of olefins or mixtures of olefins containing diluents such as paraffinic hydrocarbons and the like. The normally gaseous olefins such as ethene, propene, butylenes, etc. are particularly suitable, but the higher olefins such as hexenes, heptenes, and the like may be used. The invention also applies to various diolefins such as butadiene, isoprene, hexadienes, as such or in mixtures with mono-olefins. Since ethylene is difficult to polymerize, it should generally be present in mixtures containing higher molecular weight olefins. Preferred feed stocks are those containing in the range of about 30 to 70% of $C_3$ and/or $C_4$ olefins, the remainder being $C_3$—$C_4$ paraffins.

The hydrocarbon in the reaction zones may be in the form of a vapor phase, liquid phase, mixed vapor-liquid phase, or critical phase at pressures above the critical for the hydrocarbons, such as above about 900 p. s. i. g. for the normally gaseous olefins.

The present invention is further illustrated by the following examples which are not to be construed as limiting the scope thereof. A series of runs were made to determine the relative reactor volumes required to obtain various olefin conversion levels when employing normally gaseous olefin feed. One series was carried out with a fixed bed of solid phosphoric acid on kieselguhr catalyst at about 460° F. and 1000 p. s. i. g. at various olefin conversion levels. Another series employed approximately 100% liquid phosphoric acid catalyst at about 360° F. and 500 p. s. i. g. at various olefin conversion levels. The conditions used were substantially optimum for each type of catalyst. Calculations were then made to determine the total reactor volume required in each case at the various conversion levels for a plant charging 4450 barrels per day of $C_3$—$C_4$ feed containing about 50% olefins. Since the activity of the solid catalyst declines appreciably with time, it was necessary to determine volumes for both the fresh and relatively spent catalyst in order to obtain a realistic average volume applicable to commercial operations. The results are tabulated below:

| Catalyst Employed | Reactor Volume, Cubic Feet | | | |
|---|---|---|---|---|
| | Solid | | | Liquid |
| | Fresh | Spent | Average | |
| Olefin Conversion Level, percent: | | | | |
| 70 | 122 | 243 | 183 | 342 |
| 80 | 191 | 381 | 286 | 448 |
| 85 | 264 | 528 | 396 | 513 |
| 90 | 398 | 798 | 598 | 617 |
| 95 | 760 | 1,520 | 1,140 | 780 |

With the solid catalyst, the amount of olefin polymerized per unit time is quite large at high olefin concentrations, but this amount decreases markedly as olefin concentration decreases. About six times more reactor volume is required to obtain 95% conversion than is required for 70% conversion. With the liquid catalyst, however, increasing conversion from 70 to 95% increases volume requirements only about two times. It is noted that the liquid catalyst is less favorable than the solid catalyst at high olefin concentrations, but considerably more favorable at low olefin concentrations.

Thus, the combination process of the present invention may be employed in the following specific manner. The solid catalyst is first contacted with olefin feed to obtain a conversion level of about 75%. The total withdrawn effluent then contacts the liquid catalyst whereby total olefin conversion is increased to about 95%. Under these conditions the total reactor volume required for both reaction zones is only about 550 cubic feet for a plant having the capacity described above. When using only liquid catalyst, the volume requirement is about 780 cubic feet to obtain a comparable conversion level. With only solid catalyst, the volume is about 760 cubic feet for fresh catalyst or 1140 cubic feet for catalyst of average activity. It follows that investment costs for new equipment are considerably reduced in addition to savings realized by prolonging the life of the solid catalyst, and the like.

A particularly advantageous application of the present invention is that of building a relatively small liquid phosphoric acid catalytic unit to be used in series with existing fixed bed and the like solid catalyst units. The investment costs for the liquid catalyst unit are considerably lessened even though expensive corrosion resistant metals are used. The feed throughput for the solid catalyst unit, may therefore, be greatly increased to take advantage of the lower conversion levels needed in this zone. The liquid catalyst system would be used for the olefin clean-up zone as described above. The relative sizes of the two units should of course be adjusted to provide the necessary contact times for obtaining desired conversion levels in each zone.

The present invention has particular application to a process in which the effluent containing unreacted olefins is passed without further separation to the second zone. The advantages are also obtained by subjecting the first zone effluent to a partial separation step, such as the partial or complete removal of polymer, before charging to the second zone, providing olefin concentration is substantially lower in the second zone feed than in the first zone feed. This mode might, for example, be applied in the event the fresh olefin feed contained inert paraffinic diluents which would pass with unreacted olefin to the second zone after removal of the polymer. This procedure has the disadvantage of requiring intermediate separation equipment. Other modifications of this invention will be apparent to those skilled in the art.

What is claimed is:

1. The process of polymerizing olefins which comprises contacting an olefin with a phosphoric acid supported on a solid carrier whereby substantial olefins are polymerized, and then contacting the product therefrom, containing unreacted olefin, with a liquid phosphoric acid whereby substantial polymerization of the unreacted olefin occurs.

2. The process of polymerizing olefin hydrocarbons which comprises passing an olefin feed stream through a first catalytic zone including a phosphoric acid supported on a solid carrier whereby at least a major portion of the olefins are polymerized, and then passing the effluent, including unreacted olefins, from said first zone through a second catalytic zone including a liquid phosphoric acid whereby the unreacted olefins are substantially completely polymerized.

3. An improved process for polymerizing olefin hydrocarbons which comprises first contacting an olefin feed stream with a phosphoric acid supported on a solid carrier in a first catalytic zone whereby at least 65% of the olefins are polymerized, and then passing the effluent therefrom including unreacted olefins and polymer, through a liquid pool of a phosphoric acid in a second catalytic zone whereby the unreacted olefins are substantially completely polymerized.

4. A process as in claim 3 wherein in the range of about 65 to 90% of the olefins are polymerized in said first zone.

5. An improved process for polymerizing normally gaseous olefin hydrocarbons which comprises contacting an olefin feed stream with a solid phosphoric acid catalyst in a first catalytic zone whereby in the range of about 65 to 90% of the olefins are polymerized, and then passing the effluent, without intermediate separation, from said first zone through a pool of circulating liquid phosphoric acid in a second zone whereby the unreacted olefins are substantially completely polymerized to polymers having substantially the same molecular weight as polymers formed in said first zone.

References Cited in the file of this patent

UNITED STATES PATENTS

| 2,314,457 | Roetheli et al. | Mar. 23, 1943 |
| 2,572,724 | Hinds | Oct. 23, 1951 |
| 2,658,932 | Cohen et al. | Nov. 10, 1953 |

FOREIGN PATENTS

| 804,591 | France | Oct. 27, 1936 |